United States Patent
O'Dea et al.

(10) Patent No.: US 8,024,098 B2
(45) Date of Patent: Sep. 20, 2011

(54) SYSTEM AND METHOD FOR DETERMINING THE ENGAGEMENT POINT OF A CLUTCH

(75) Inventors: Kevin A. O'Dea, Ann Arbor, MI (US); Michael P. Turski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 562 days.

(21) Appl. No.: 12/208,023

(22) Filed: Sep. 10, 2008

(65) Prior Publication Data

US 2010/0063699 A1    Mar. 11, 2010

(51) Int. Cl.
*G06F 7/00* (2006.01)
*G06F 17/00* (2006.01)
(52) U.S. Cl. .......................... 701/67; 701/68
(58) Field of Classification Search .................. 701/67, 701/68; 192/30 W, 3.61–3.63, 99 S; 477/180, 477/174, 166, 86
See application file for complete search history.

(56) References Cited

U.S. PATENT DOCUMENTS

| | | | | |
|---|---|---|---|---|
| 5,393,274 A * | 2/1995 | Smedley | | 477/74 |
| 6,001,044 A * | 12/1999 | Amendt | | 477/180 |
| 6,309,325 B1 * | 10/2001 | Baer et al. | | 477/174 |
| 6,658,341 B2 * | 12/2003 | Inoue et al. | | 701/67 |
| 7,445,107 B2 * | 11/2008 | Kawamoto et al. | | 192/85.63 |
| 2007/0061060 A1 * | 3/2007 | Karrelmeyer et al. | | 701/67 |
| 2010/0198470 A1 * | 8/2010 | Weck et al. | | 701/67 |
| 2010/0222973 A1 * | 9/2010 | Senda et al. | | 701/54 |
| 2011/0093176 A1 * | 4/2011 | Kunze | | 701/68 |

* cited by examiner

*Primary Examiner* — Kaitlin S Joerger
*Assistant Examiner* — Prasad V Gokhale
(74) *Attorney, Agent, or Firm* — Ingrassia Fisher & Lorenz P.C.

(57) ABSTRACT

A method of determining an engagement position of a clutch of a vehicle is provided. The clutch is operable by a clutch pedal adapted to move over a travel range. The method comprises determining a rate of change of position of the clutch pedal, locating a dwelling range of the clutch pedal, the dwelling range comprising a plurality of positions of the clutch pedal along the travel range during which the rate of change of position of the clutch pedal is less than a predetermined rate of change for a predetermined length of time, and recording the travel positions of the clutch pedal in the dwelling range.

20 Claims, 3 Drawing Sheets

SYSTEM AND METHOD FOR DETERMINING THE ENGAGEMENT POINT OF A CLUTCH

TECHNICAL FIELD

Embodiments of the subject matter described herein relate generally to clutch mechanisms. More particularly, embodiments of the subject matter relate to determining the engagement point of a clutch.

BACKGROUND

Automobiles and other vehicles typically have an engine with a multi-gear transmission. A clutch is typically used to engage a selected gear to a drive shaft, thereby transmitting power to the drive wheels of the automobile, or similar propulsion mechanism of other vehicles. Control of the clutch in automobiles is typically maintained by the operator in automobiles with manual transmissions and, in automatic transmissions, a control mechanism which performs gear-shifting under pre-determined conditions. Some automatic transmissions permit the operator to retain limited or complete control over gear selection, while still managing clutch engagement.

For partially- and fully-automatic transmissions, it is advantageous to ascertain the point of engagement of the clutch as accurately as possible. The engagement point of the clutch is the position of the clutch at which the selected gear interfaces with the drive shaft, beginning power transmission. Clutches in manual and partially-automatic vehicles are typically operated through the use of a clutch pedal. The operator can ascertain the engagement point of the clutch through feedback from various sources, including tactile feedback transmitted via the clutch pedal, changes in torque or revolution speed of the engine, engine sound, and so on. The operator can thusly ease the clutch through its operation, resulting in a gentle clutch engagement and graceful acceleration.

An automatic transmission control system or computer system can be given information corresponding to the engagement point of the clutch during manufacture or initial calibration. During the lifetime of the vehicle, however, the engagement point can change due to a variety of reasons, including component wear, and equipment maintenance and replacement. Accordingly, it can be difficult to continue to automatically operate some vehicles at peak efficiency over the lifetime of the vehicle.

BRIEF SUMMARY

A method of determining an engagement position of a clutch of a vehicle is provided. The clutch is operable by a clutch pedal adapted to move over a travel range. The method comprises determining a rate of change of position of the clutch pedal, locating a dwelling range of the clutch pedal, the dwelling range comprising a plurality of positions of the clutch pedal along the travel range during which the rate of change of position of the clutch pedal is less than a predetermined rate of change for a predetermined length of time, and recording the travel positions of the clutch pedal in the dwelling range.

Another method of determining an engagement position of a clutch of a vehicle is also provided. The clutch is operable by a clutch pedal adapted to travel over a travel range. The method comprises receiving sensor data indicating a travel position of the clutch pedal, determining, from the sensor data, a positional rate of change of the clutch pedal, locating a first travel position of the clutch pedal at which the positional rate of change is less than a predetermined rate of change during a predetermined length of time, and recording the first travel position of the clutch pedal.

A clutch system for a vehicle is also provided. The clutch system comprises a clutch manipulator adapted to operate over a travel range, a sensor adapted to obtain sensor data indicative of a travel position of the clutch manipulator, the travel position being within the travel range, and a processing architecture coupled to the sensor. The processing architecture is adapted to receive the sensor data, determine, from the sensor data, the travel position of the clutch manipulator relative to the travel range, determine, from the sensor data, a positional rate of change of the clutch manipulator over time, compare the positional rate of change to a predetermined rate of change, and locate a dwelling range of the clutch manipulator along the travel range during which the positional rate of change is less than the predetermined rate of change for at least a predetermined length of time.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices, such as a sensor and/or computer system. In practice, one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

Some vehicles, including automobiles, can have multi-gear transmissions in which gear-selecting and shifting is at least partially assisted by some mechanism. Typically such transmissions are operable through the positioning of a clutch pedal coupled to a clutch. Some features of such automobiles can manipulate the clutch to augment performance of the vehicle, or perform supplementary control functions of the clutch during manual operation of the clutch via the clutch pedal. For such features, it is advantageous to locate as accurately as possible the engagement point where the clutch causes interaction between a power-transmitting member and the selected gear.

Figure 1:
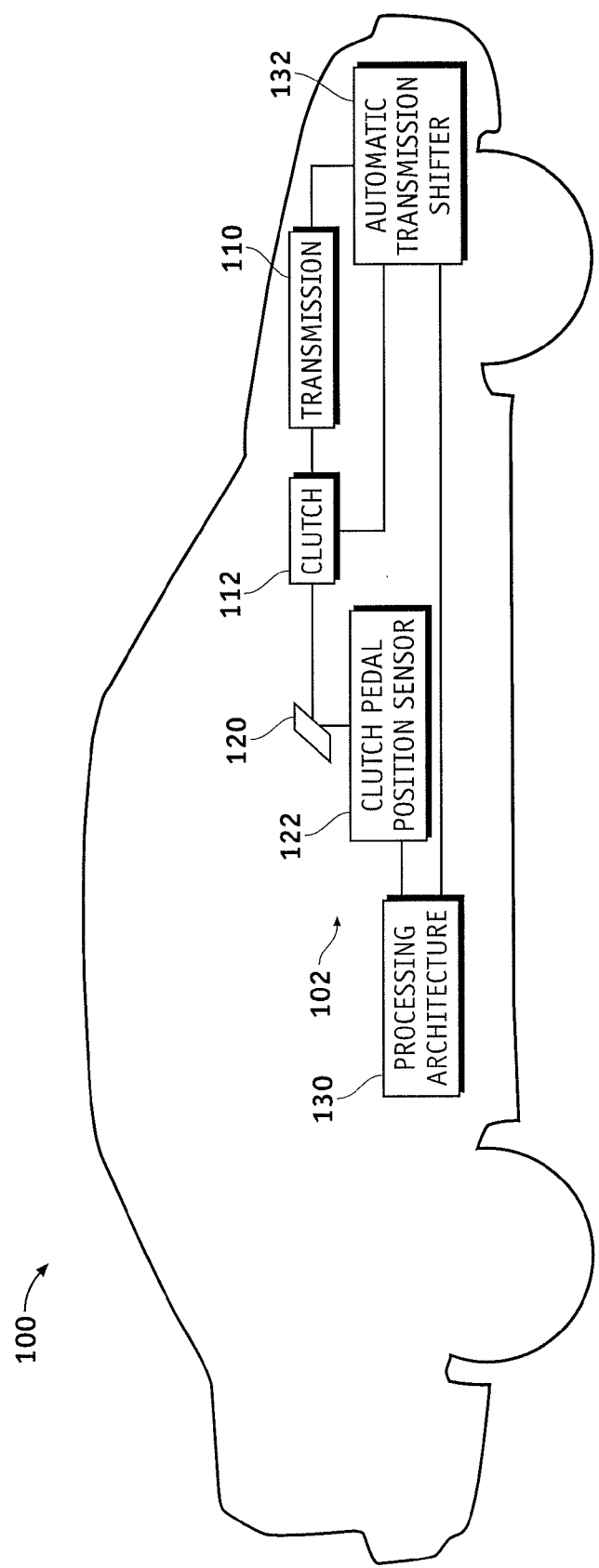
FIG. 1 is a schematic diagram of a vehicle comprising a clutch engagement point determination system.

Accordingly, FIG. 1 illustrates an embodiment of a vehicle 100 comprising an engagement point determination system 102. The vehicle 100 preferably comprises a transmission 110 operated by a clutch 112. The vehicle 100 can further comprise a clutch pedal 120 coupled to the clutch 112. The system 102 can comprise a clutch pedal position sensor 122 coupled to the clutch pedal 120 and adapted to provide position information to a processing architecture 130. An automatic transmission shifter 132 can be coupled to the processing architecture 130, as well as the transmission 110 and clutch 112. The processing architecture 130 can use the position information to determine the engagement point of the clutch 112. The engagement point information can be stored, adjusted over time, and made available to other elements or components of the vehicle 100, such as the automatic transmission shifter 132. Such components can benefit from the determination of the engagement point to manipulate the clutch 112 and/or transmission 110 more efficiently when performing operations at least partially independent from the operator's use of the clutch pedal 120.

While the vehicle 100 is illustrated as an automobile for use in describing an embodiment, other vehicles, such as trucks, sport utility vehicles, tractors, heavy equipment vehicles, including tractors and bulldozers, motorcycles, all-terrain vehicles, certain aircraft, and the like can also embody the system 102. Additionally, although the clutch manipulation interface is described as a clutch pedal 120, other devices, including grips, levers, and so on, can also be used. The operator of the vehicle 100 can be referred to as a driver.

The transmission 110 preferably comprises multiple gears for use in engaging a power-transmitting element of an engine of the vehicle 100. The rate of engagement of the clutch with the transmission 110 can be adjusted and controlled by the operator of the vehicle 100 using a clutch pedal 120. The components can be coupled together as appropriate for use in the vehicle 100. Typically, for example, the clutch pedal 120 can be hydraulically coupled to the clutch 112, though other techniques can also be used, such as a connection or coupling using electromechanical components.

The clutch pedal 120 preferably is positionable by the operator of the vehicle 100 over a travel range. Typically the clutch pedal 120 is positioned in a released position when untouched by the operator. The operator can push the clutch pedal 120 along the travel range, moving the clutch 112, to any position corresponding to complete movement through the travel range.

Typically, when a clutch pedal 120 is in the released position, the clutch 112 is fully engaged with the transmission 110. When pressure is applied to the clutch pedal 120 by the operator, it can move through the travel range. While moving through the travel range, the position of the clutch pedal 120 can be called the travel position, which identifies its position relative to the overall length of travel, angular position, amount of rotation relative to a reference point, or the like, as described below. If sufficient pressure is applied to the clutch pedal 120, it will travel past the engagement point, disengaging the clutch 112 from the transmission 110. After passing the engagement point, the clutch pedal 120 will reach a terminal position at the far end of the travel range from the released position. The clutch pedal 120 is typically prohibited from further movement by contact with a mechanical stop. When in the fully-depressed position, the clutch pedal 120 corresponds to a position maintaining the clutch 112 away from transmission 110. The motion to move the clutch pedal 120 to a fully-depressed position is commonly known as "putting the clutch in."

Hydraulic pressure or some other mechanism can bias the clutch 112, and accordingly, the clutch pedal 120, toward the released position. Thus, when the operator reduces the force exerted on the clutch pedal 120 ("lets the clutch out"), it can travel back towards the released position. During movement of the clutch pedal 120 toward the released position, the clutch 112 will re-engage the transmission. The position of the clutch 112 when re-engaging the transmission is known as the engagement point of the clutch 112. The engagement point of the clutch 112 corresponds to a certain position of the clutch pedal 120.

The travel position of the clutch pedal 120 over the travel range is described during the transition from a fully-depressed position to the released position. Thus, a clutch pedal 120 that has moved 0% of the travel range toward the released position is in the fully-depressed position. Similarly, a clutch pedal 120 that has moved 50% of the travel range is midway between the fully-depressed position and the release position. When the clutch pedal 120 has moved 100% of the travel range, it has arrived in the released position. When "the position" of the clutch pedal 120 is used herein, it refers to the travel position of the clutch pedal 120.

Figure 2:
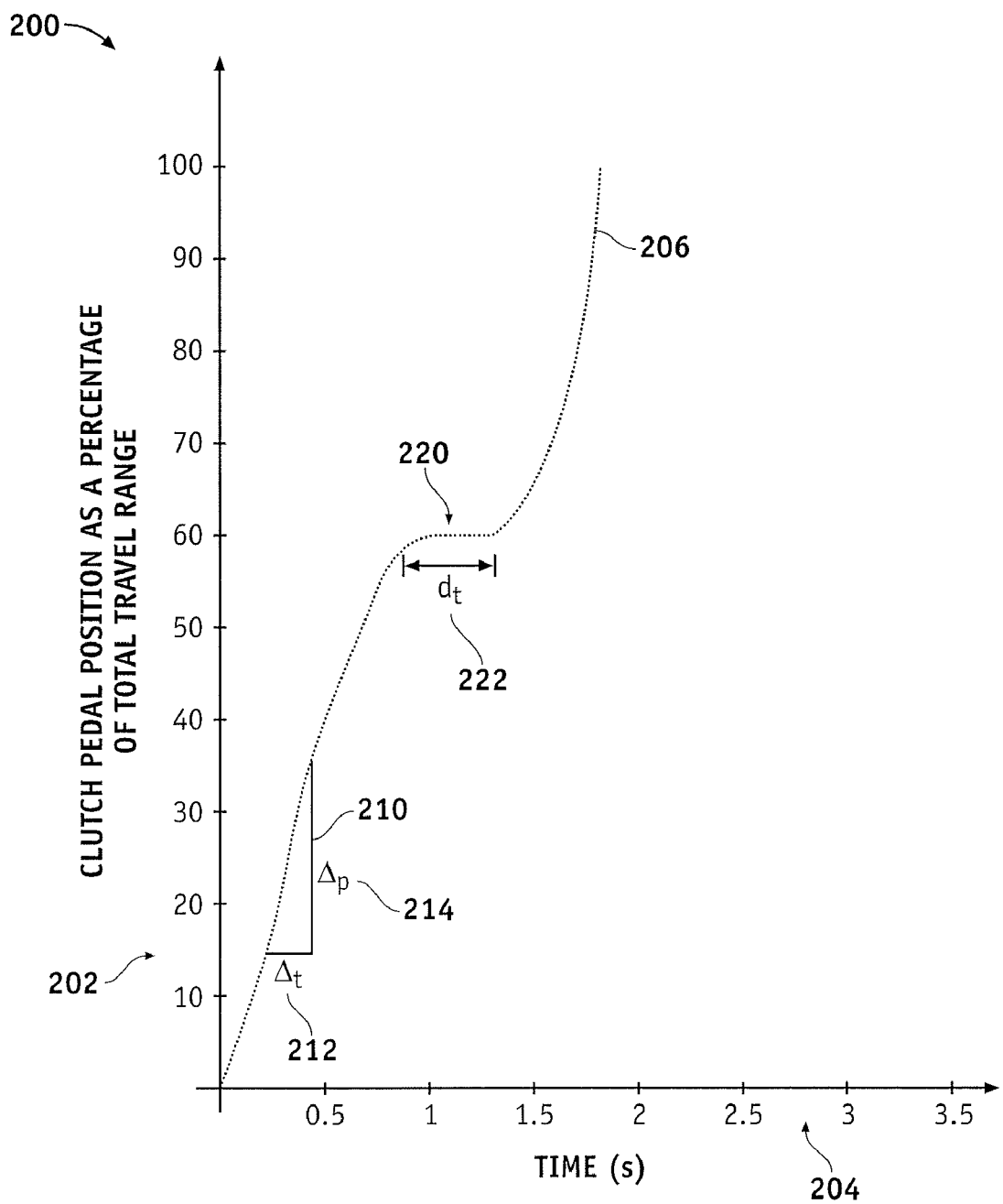
FIG. 2 is a graph of clutch pedal position over time for a manually-operated clutch.

The position sensor 122 coupled to the clutch pedal 120 preferably is adapted to detect the position of the clutch pedal 120 along the travel range. FIG. 2 illustrates an exemplary graph 200 showing the position 206 over time 204 as a percentage 202 of the total travel range, or travel distance, and will be discussed in greater detail below.

The position sensor 122 can be any appropriate type of sensor, such as a potentiometer, an accelerometer, an optical sensor, a transducer, a series of contacts or switches, and so on. Preferably, the position sensor 122 is coupled to the clutch pedal 120 and senses the position directly. In other embodiments, it can be coupled to an intermediary component between the clutch pedal 120 and the clutch 112. In such an embodiment, the position sensor 122 can detect the position of the clutch pedal 120 indirectly. Certain sensors can provide clutch pedal positions associated with time references and/or the processing architecture 130 can associate position data with the time it is received to determine the movement of the clutch pedal 120 over time.

The position sensor 122 is preferably coupled to the processing architecture 130. The processing architecture 130 can comprise a processor, memory module, storage device, and bus element, as well as other hardware and software features appropriate to perform the operations described herein. In certain embodiments, the processing architecture 130 can perform additional functions and control other features of the vehicle 100, including automated and partially automated control and positioning of the clutch 112. The processing architecture 130 can be adapted to receive sensor data from the position sensor 122, process/analyze the sensor data, and associate the position of the clutch pedal 120, as determined from the sensor data, with a time. Preferably, the processing architecture can be further adapted to determine the engagement point of the clutch, as described below, and store certain aspects of the engagement point determination.

In some embodiments, the vehicle 100 can further comprise an automatic transmission shifter 132. The automatic transmission shifter 132 can be coupled to the transmission 110, the clutch 112, and the processing architecture 130, as shown. Preferably the automatic transmission shifter 132 can partially or entirely replace manual operation of the clutch 112, controlling the changing and engagement of gears during operation of the vehicle. In certain embodiments, the automatic transmission shifter 132 can adjust the operation of the clutch 112 in response to movement of the clutch pedal 120, resulting in certain performance and/or efficiency improvements.

The processing architecture 130 can provide the engagement point or average engagement point to the automatic transmission shifter 132. The automatic transmission shifter 132 can engage the clutch 112 without input or control from the operator via the clutch pedal 120, or can augment the operator's control to improve performance, efficiency, or comfort of the vehicle 100. In certain embodiments, the processing architecture 130 operates the automatic transmission shifter 132 to perform these tasks, incorporating the use of the determined engagement point, or average engagement point.

Figure 3:
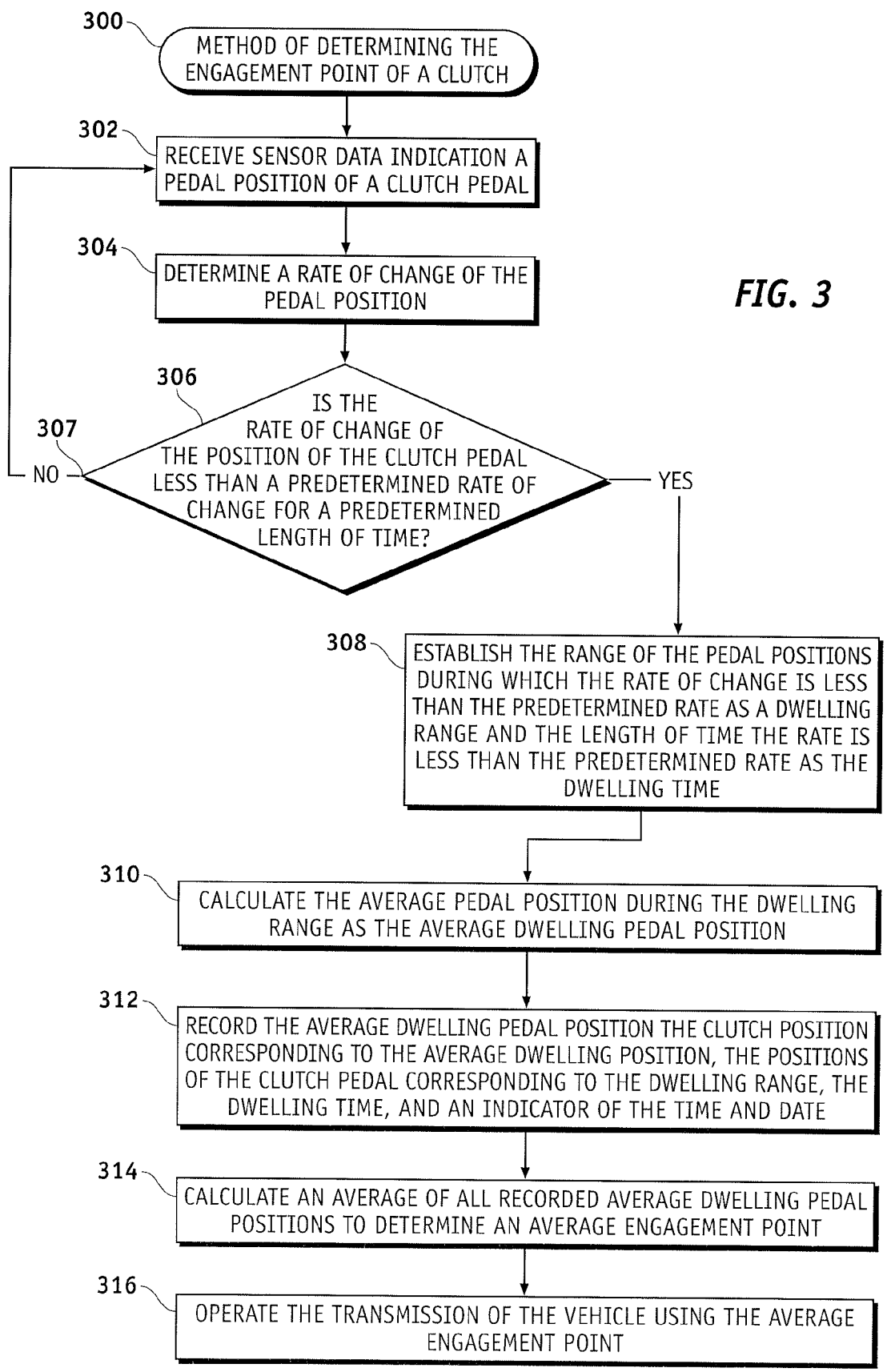
FIG. 3 is a flow chart that illustrates an exemplary method of determining the engagement point of a clutch.

With additional reference to FIGS. 2 and 3, at least one method of determining the engagement position of a clutch can be described with reference to vehicle 100 of FIG. 1. FIG. 3 illustrates a flow chart of an exemplary method 300 for determination of the clutch engagement point. The various tasks performed in connection with method 300, as explained in the context of the vehicle 100 of FIG. 1 and graph 200 of FIG. 2, may be performed by software, hardware, firmware, or any combination thereof. In practice, portions of method 300 may be performed by different elements of the described system, e.g., position sensor 122 or processing architecture 130. It should be appreciated that method 300 may include any number of additional or alternative tasks, the tasks shown in FIG. 3 need not be performed in the illustrated order, and method 300 may be incorporated into a more comprehensive procedure or process having additional functionality not described in detail herein.

One method of determining the engagement point of the clutch 112 can take advantage of the feedback provided to the operator of the vehicle 100. During typical manipulation of the clutch pedal 120, an operator will, based on feedback from the vehicle 100 and its engine, adjust the rate of engagement of the clutch 112 by slowing the travel of the clutch pedal 120 near the engagement point. By examining the positioning and motion of the clutch pedal 120 during manipulation by the operator, the processing architecture 130 can determine the engagement point according to one or more criteria. The motion of the clutch pedal 120 over time can be determined from sensor data provided by the position sensor 122.

With additional reference to FIG. 2, the position 206 of the clutch pedal 120 is shown during movement over the travel range. The graph 200 illustrates a typical engagement of the clutch 112. The movement of the clutch pedal 120 is indicative of an engagement over approximately two seconds, with a dwelling point 220 at approximately 60% of the travel of the clutch pedal 120. The dwelling point 220 occurs as the operator eases the clutch 112 through the engagement point, reducing or eliminating any sharp motion resulting from brisk engagement of the clutch 112 to the transmission 110.

The dwelling point 220 typically is manifest as a reduction in speed of release (or movement) of the clutch pedal 120 at or near the engagement point along the travel range. The dwelling point 220 can occur over a dwell time 222. The identification of the dwelling point 220 can determine the position of the clutch pedal 120 over the travel range that corresponds to the engagement point of the clutch 112. Thus, it is advantageous for the processing architecture 130 to examine data from the position sensor 122 for evidence of a dwelling point 220.

The dwelling point 220 can be defined by certain criteria. For example, preferably, the dwelling point 220 can be the point at which the rate of change of position of the clutch pedal 120 falls below a predetermined value for a predetermined length of time. The rate of change of position, or speed of release, of the clutch pedal 120 can be determined by examining the sensor data to find the change of the clutch pedal 120 in position over time. The change in position of the clutch pedal 120 over a given period of time corresponds to the slope of the graph 200, as shown at segment 210.

Over segment 210, the position of the clutch pedal 120 changes by $\Delta_p$, while the time elapsed is $\Delta_t$. As $\Delta_p$ is approximately 20% of the travel range while $\Delta_t$ is approximately 0.25 seconds, the rate of change of position of the clutch pedal 120 is approximately 80%/s over segment 210. By contrast, at the dwelling point 220, the rate of change of position has dropped to approximately 0%/s over the dwelling time, which is approximately 0.5 seconds. Accordingly, the clutch pedal 120 is at a position corresponding to the engagement point. As can be seen, the position is approximately 60% of the travel range. The position of the clutch 112 associated with 60% travel can be recorded as the engagement point.

Referring to FIG. 3, the processing architecture 130 can receive sensor data (task 302), preferably at a sufficiently high polling rate to provide resolution adequate to determine the rate of change of the position of the clutch pedal 120 over short periods of time. A position sensor 122 having a higher polling rate is preferable. The processing architecture 130, then, can determine the rate of change of position of the clutch pedal 120 during release of the clutch 112 (task 304). When compared against certain predetermined values, the processing architecture 130 can locate a dwelling point 220, a dwelling time 222, and the corresponding position of the clutch 112, at the engagement point (task 306). If the sensor does not provide sensor data indicating a dwelling point, the processing architecture 130 can return to monitoring for the next operation of the clutch 112 to determine if a dwelling point exists. In this regard, the exemplary embodiment of method 300 depicts the "NO" branch of task 306 leading back to task 302.

As described above, the processing architecture 130 can determine whether a dwelling point exists by comparing the position and/or speed of the clutch pedal 120 during release to a predetermined speed and predetermined length of time (task 306). In certain embodiments, a dwelling point 220 can be identified as one where the speed of the clutch pedal 120 is below 10% per second. Other values for the threshold speed can be used, as desired, such as 8%/s, 14%/s, 20%/s, and so on. The clutch pedal speed preferably is below the threshold speed for a predetermined threshold length of time to permit the conclusion that a dwelling point has been manifest.

The value of the threshold length of time can also vary between embodiments. In certain embodiments, the clutch pedal 120 must travel below the threshold speed for at least 0.2 seconds for a dwelling point to be established as manifest. In other embodiments, the clutch pedal travel speed must be below 0.3 seconds, 0.35 seconds, 0.4 seconds, 0.45 seconds, and so on. The values for the threshold speed and/or length of time can vary between embodiments, and can be adjusted for individual vehicles 100 and/or systems 102.

Preferably, determination (task 306) of the engagement point is made by examining the motion of the clutch pedal 120 during engagement of the first, or largest, gear of the transmission 110. The slowing of the clutch pedal 120 by the operator at and near the engagement point is most pronounced when accelerating the vehicle 100 from a stopped position in first gear. In certain embodiments, the vehicle 100 need not be completely stopped, but operating sufficiently slowly as to still obtain the desired results. Accordingly, the processing architecture 130 can only perform the described operations when it determines, though other sensory data, that the operation of the vehicle 100 meets those conditions. The processing architecture 130 can determine the engagement point under other conditions, if desired and suitably configured.

Because the clutch pedal 120 continues to move during the dwelling point 220, even if slowly, the clutch pedal 120 can occupy a range of positions, known as the dwelling range. Preferably, after determining that a dwelling point 220 has been encountered, the processing architecture 130 can determine the range of positions of the clutch pedal 120 corresponding to the dwelling range (task 308). In some embodiments, the processing architecture 130 can select one value of the position of the clutch pedal 120 to use as the pedal position at the dwelling point 220. One such selected position can be the position the clutch pedal 120 was at when the rate of change of clutch pedal position fell below the predetermined rate of change. In other embodiments, other positions can be used, such as the position of the clutch pedal 120 at the midpoint of the dwelling range or the position of the clutch pedal was at when the rate of change of the pedal position exceeded the predetermined rate of change.

In certain embodiments, the position of the clutch pedal 120 at the dwelling point 220 can be determined by use of an average (task 310). When a dwelling point 220 is encountered, the processing architecture 130 can determine the change in position of the clutch pedal 120 over the dwelling range, $\Delta_p$, during the dwelling time 222. As desired for an embodiment, the processing architecture can determine the mean and/or median position of the clutch pedal 120 during the dwelling time 222, and record this position as an average dwelling pedal position (tasks 310, 312). The average dwelling pedal position can be referred to as to the position of the clutch pedal 120 at the dwelling point 220 for those embodiments which calculate an average. For those embodiments which select a position or use another technique to determine a single position of the clutch pedal 120, the position of the clutch pedal 120 at the dwelling point 220 can refer to the selected or determined position.

Additionally, the processing architecture 130 preferably determines the position of the clutch 112 corresponding to the travel position of the clutch pedal 120 at the dwelling point 220. The processing architecture 130 can use either a selected position of the clutch pedal 120 or an average value of the positions over the dwelling range, as appropriate to the embodiment. Having made this determination, the processing architecture 130 can record, together with the dwelling time 222, the values for future use by other features or components of the vehicle 100 (task 312). Certain embodiments of the processing architecture 130 can record less or more information, including the sensor data for the entire clutch travel, as desired.

Under certain circumstances, the operator can manipulate the clutch pedal 120 in such a manner that a dwelling point does not occur when releasing the clutch. The processing architecture 130 can receive sensor data indicating that, for example, the clutch pedal 120 does not travel less than the threshold or predetermined rate of speed and, accordingly, does not identify a dwelling point. The processing architecture 130 can then continue to monitor the sensor data for conditions satisfying the criteria for a dwelling point without making a record for such operations. In some embodiments, the processing architecture 130 can record and/or save an indicator that, although the vehicle 100 was starting from a rest position in the first gear, no dwelling point was detected.

Additionally, because the position of the clutch 112 at the engagement point can change over time, the processing architecture 130 can perform certain operations and/or store different information for use. As one example, each time a dwelling point 220 is encountered, the processing architecture 130 can compare the travel position of the clutch pedal 120 with all previously-stored clutch pedal 120 positions to determine an average (task 314). The average—whether mean or median—position can then be used to determine the average engagement point. Accordingly, the processing architecture 130 can account for minute, cumulative changes in the position of the engagement point.

When computing the average engagement point, certain factors can be indicative of more accurate or reliable determinations. For example, long dwelling times are more reliable indicators of engagement point position than short dwelling times. Additionally, because wear can alter the performance and/or interaction of the transmission 110 and clutch 112, more recent, or newer, determinations of engagement position can be more accurate than older records. Accordingly, when the average is computed, it can be weighted by such factors. Preferably, during calculation, longer dwelling times are accorded more weight than shorter dwelling times and more recent records of engagement point determination are accorded more weight than older records.

In some embodiments, while calculating an average, the farthest outlying, or extreme, values of some factors can be ignored to moderate the effect of outlying records. For example, an average can ignore the clutch positions associated with the shortest and furthest travel positions, the shortest or longest dwelling times, and/or the newest and oldest records. In certain embodiments, two of each of the records can be ignored. That is, the clutch positions associated with the two shortest dwelling times and two longest dwelling times can be left out from averaging, if desired. The number of ignored or discarded recorded entries can vary between embodiments, as desired.

After determining the position of the engagement point, including the average or weighted average of the position, the vehicle's 100 automatic transmission shifter 132 can be operated as described above, using the information (task 316).

One source of change of position of the engagement point over the lifetime of the vehicle 100 can be equipment changes, as mentioned above. Under some circumstances, it can be desirable to erase recorded engagement and/or dwelling point records, including any averaged records, to reset the determined engagement point. One such situation can occur after the installation of a new clutch 112. Because the performance characteristics are likely to vary from the old clutch, new position data is preferable, and should not be influenced by or averaged with records associated with the old clutch.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of determining an engagement position of a clutch of a vehicle, the clutch operable by a clutch pedal adapted to move over a travel range, and the method comprising:
   determining a rate of change of position of the clutch pedal;
   locating a dwelling range of the clutch pedal, the dwelling range comprising a plurality of positions of the clutch pedal along the travel range during which the rate of change of position of the clutch pedal is less than a predetermined rate of change for a predetermined length of time; and
   recording the travel positions of the clutch pedal in the dwelling range.

2. The method of claim 1, wherein
   the vehicle comprises a transmission;
   the transmission has a plurality of gears having different sizes; and
   the rate of change of position of the clutch pedal is determined during engagement of the transmission to a largest gear.

3. The method of claim 1, further comprising:
   calculating an average of the pedal positions in the dwelling range to determine an average dwelling pedal position.

4. The method of claim 3, further comprising:
   recording, at different times, a plurality of average dwelling pedal positions to create a plurality of recorded average dwelling positions; and
   calculating an average of the recorded average travel positions to determine an average engagement point pedal position.

5. The method of claim 4, further comprising:
   obtaining a clutch position of the clutch, the clutch position being associated with the average engagement point pedal position; and
   recording the clutch position.

6. The method of claim 4, wherein calculating the average of the recorded average travel positions comprises calculating a weighted average of the recorded average travel positions.

7. The method of claim 6, wherein:
   recording the plurality of average dwelling pedal positions comprises storing respective time and date indicators corresponding to the plurality of recorded average dwelling pedal positions; and
   calculating the weighted average comprises assigning a greater weight to a newer record of the plurality of recorded average dwelling pedal positions than to an older record of the plurality of recorded average dwelling pedal positions.

8. The method of claim 6, further comprising:
   determining a length of time during which the rate of change of position of the clutch pedal is less than the predetermined rate of change;
   identifying the length of time as a dwelling time; and
   recording the dwelling times associated with the respective average engagement point pedal positions.

9. The method of claim 8, wherein calculating the weighted average comprises assigning a greater weight to a first of the plurality of recorded average dwelling positions than a second of the plurality of recorded average dwelling positions, the first of the plurality of recorded average dwelling positions associated with a longer dwelling time than the second of the plurality of recorded average dwelling positions.

10. A method of determining an engagement position of a clutch of a vehicle, the clutch operable by a clutch pedal adapted to travel over a travel range, the method comprising:
    receiving sensor data indicating a travel position of the clutch pedal;
    determining, from the sensor data, a positional rate of change of the clutch pedal;
    locating a first travel position of the clutch pedal at which the positional rate of change is less than a predetermined rate of change during a predetermined length of time; and
    recording the first travel position of the clutch pedal.

11. The method of claim 10, wherein the positional rate of change is determined when the vehicle accelerates from a reference position.

12. The method of claim 11, wherein the vehicle is at rest in the reference position.

13. The method of claim 10, further comprising:
    recording, at different times, a plurality of first travel positions of the clutch pedal to create a plurality of recorded travel positions; and
    calculating an average of the recorded travel positions to determine an average clutch pedal position.

14. The method of claim 13, wherein the vehicle further comprises an automatic transmission shifter and the method comprises engaging the clutch with the automatic transmission shifter at a clutch position associated with the average clutch pedal position.

15. The method of claim 10, wherein the vehicle further comprises a transmission and the positional rate of change is determined during engagement of the clutch to a largest gear of the transmission of the vehicle.

16. A clutch system for a vehicle, the clutch system comprising:
    a clutch manipulator adapted to operate over a travel range;
    a sensor adapted to obtain sensor data indicative of a travel position of the clutch manipulator, the travel position being within the travel range; and
    a processing architecture coupled to the sensor and adapted to:
    receive the sensor data;
    determine, from the sensor data, the travel position of the clutch manipulator relative to the travel range;
    determine, from the sensor data, a positional rate of change of the clutch manipulator over time;
    compare the positional rate of change to a predetermined rate of change; and
    locate a dwelling range of the clutch manipulator along the travel range during which the positional rate of change is less than the predetermined rate of change for at least a predetermined length of time.

17. The clutch system of claim 16, wherein the predetermined rate of change is between 0% and 20% of the travel range per second.

18. The clutch system of claim 16, wherein the predetermined rate of change is between 20% and 40% of the travel range per second.

19. The clutch system of claim 16, wherein the predetermined length of time is between 0.05 and 0.5 seconds.

20. The clutch system of claim 16, wherein the clutch manipulator comprises a clutch lever.

* * * * *